(12) United States Patent
Klein et al.

(10) Patent No.: US 11,442,621 B2
(45) Date of Patent: Sep. 13, 2022

(54) EXTENSIONS TO GLOBAL KEYBOARD SHORTCUTS FOR COMPUTING DEVICES HAVING MULTIPLE DISPLAY REGIONS

(71) Applicant: MICROSOFT TECHNOLOGY LICENSING, LLC, Redmond, WA (US)

(72) Inventors: Christian Klein, Duvall, WA (US); Peter Hammerquist, Shoreline, WA (US); David Carl Naber, Seattle, WA (US); Christoffer Peter Hart Hansen, Seattle, WA (US); Ryan Pendlay, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 131 days.

(21) Appl. No.: 16/777,813

(22) Filed: Jan. 30, 2020

(65) Prior Publication Data

US 2021/0096740 A1 Apr. 1, 2021

Related U.S. Application Data

(60) Provisional application No. 62/909,181, filed on Oct. 1, 2019.

(51) Int. Cl.
*G06F 3/04886* (2022.01)
*G06F 3/0489* (2022.01)
(Continued)

(52) U.S. Cl.
CPC .......... *G06F 3/04886* (2013.01); *G06F 3/023* (2013.01); *G06F 3/0489* (2013.01);
(Continued)

(58) Field of Classification Search
CPC .... G06F 3/04886; G06F 1/162; G06F 1/1641; G06F 1/1652; G06F 3/04817;
(Continued)

(56) References Cited

U.S. PATENT DOCUMENTS 6,965,372 B1\* 11/2005 Woods ................. G06F 3/0219
341/22
2010/0287507 A1 11/2010 Paquette et al.
(Continued)

OTHER PUBLICATIONS

ModernBob. https://social.technet.microsoft.com/Forums/windowsserver/en-US/4ad06e11-2ac1-4480-ace8-833a0b1cbe98/windows-7-sleep-timeout-not-working-as-expected?forum=w7itprogeneral (Apr. 2010). (Year: 2010).\*
(Continued)

*Primary Examiner* — Julie Anne Watko
(74) *Attorney, Agent, or Firm* — Newport IP, LLC; Leonard J. Hope

(57) ABSTRACT

A computing device detects a press of a global shortcut key simultaneously with a first press and release of a modifier key. In response thereto, an operation is initiated in a non-default display region. The operation might be displaying a user interface element in the non-default display region. The computing device can also detect a second press and release of the modifier key simultaneously with the press of the global shortcut key. In response thereto, the operation can be initiated in a second display region, such as a default display region. The second press and release of the modifier key can be detected within a predetermined period of time following the detection of the first press and release of the modifier key. The operation might be simultaneously initiated in multiple display regions, such as sharing a region that encompasses the non-default display region and one or more other display regions.

19 Claims, 16 Drawing Sheets

(51) Int. Cl.
  *G06F 3/023* (2006.01)
  *G06F 3/0484* (2022.01)
  *G06F 3/04817* (2022.01)
  *G06F 1/16* (2006.01)

(52) U.S. Cl.
  CPC ............ *G06F 1/162* (2013.01); *G06F 1/1618* (2013.01); *G06F 1/1641* (2013.01); *G06F 1/1643* (2013.01); *G06F 1/1647* (2013.01); *G06F 1/1652* (2013.01); *G06F 1/1677* (2013.01); *G06F 3/0484* (2013.01); *G06F 3/04817* (2013.01); *G06F 2203/0381* (2013.01); *G06F 2203/04803* (2013.01); *G06F 2203/04808* (2013.01)

(58) Field of Classification Search
  CPC ......... G06F 2203/04803; G06F 6/0488; G06F 3/0487; G06F 3/048; G06F 3/01; G06F 3/00; G06F 1/1637; G06F 1/1633; G06F 1/1613; G06F 1/16; G06F 1/00; G06F 3/0481; G06F 2203/048; G06F 2203/00; G06F 1/1618; G06F 1/1643; G06F 1/1647; G06F 1/1669; G06F 1/1677; G06F 2203/04808; G06F 2203/0381; G06F 3/04883; G06F 3/0484; G06F 3/0489; G06F 3/023
  See application file for complete search history.

(56) References Cited

U.S. PATENT DOCUMENTS

2012/0235921 A1 9/2012 Laubach
2012/0242692 A1 9/2012 Laubach

OTHER PUBLICATIONS

"International Search Report and Written Opinion Issued in PCT Application No. PCT/US20/050030", dated Dec. 21, 2020, 11 Pages.

* cited by examiner

LANDSCAPE POSTURES

PORTRAIT POSTURES

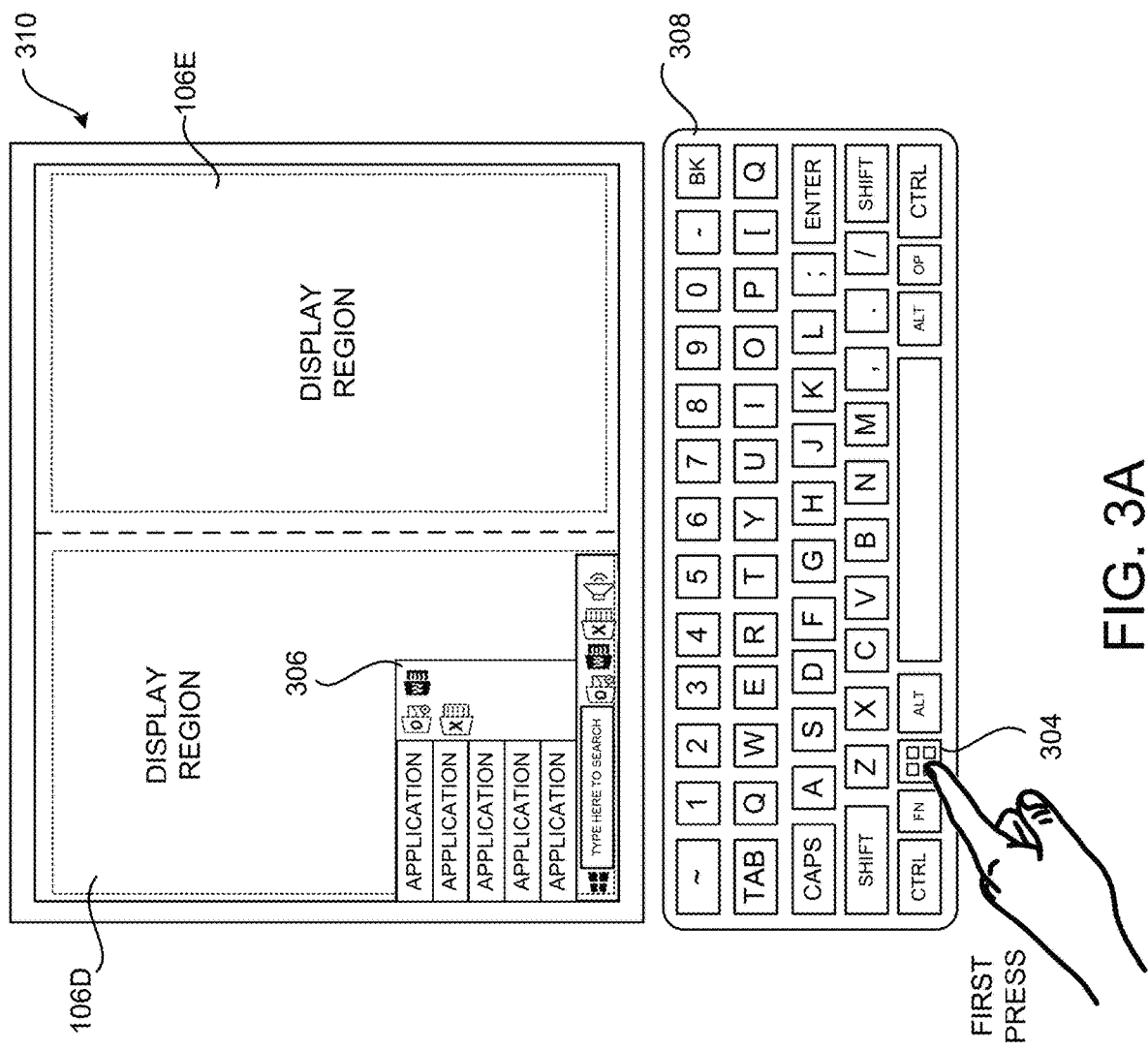

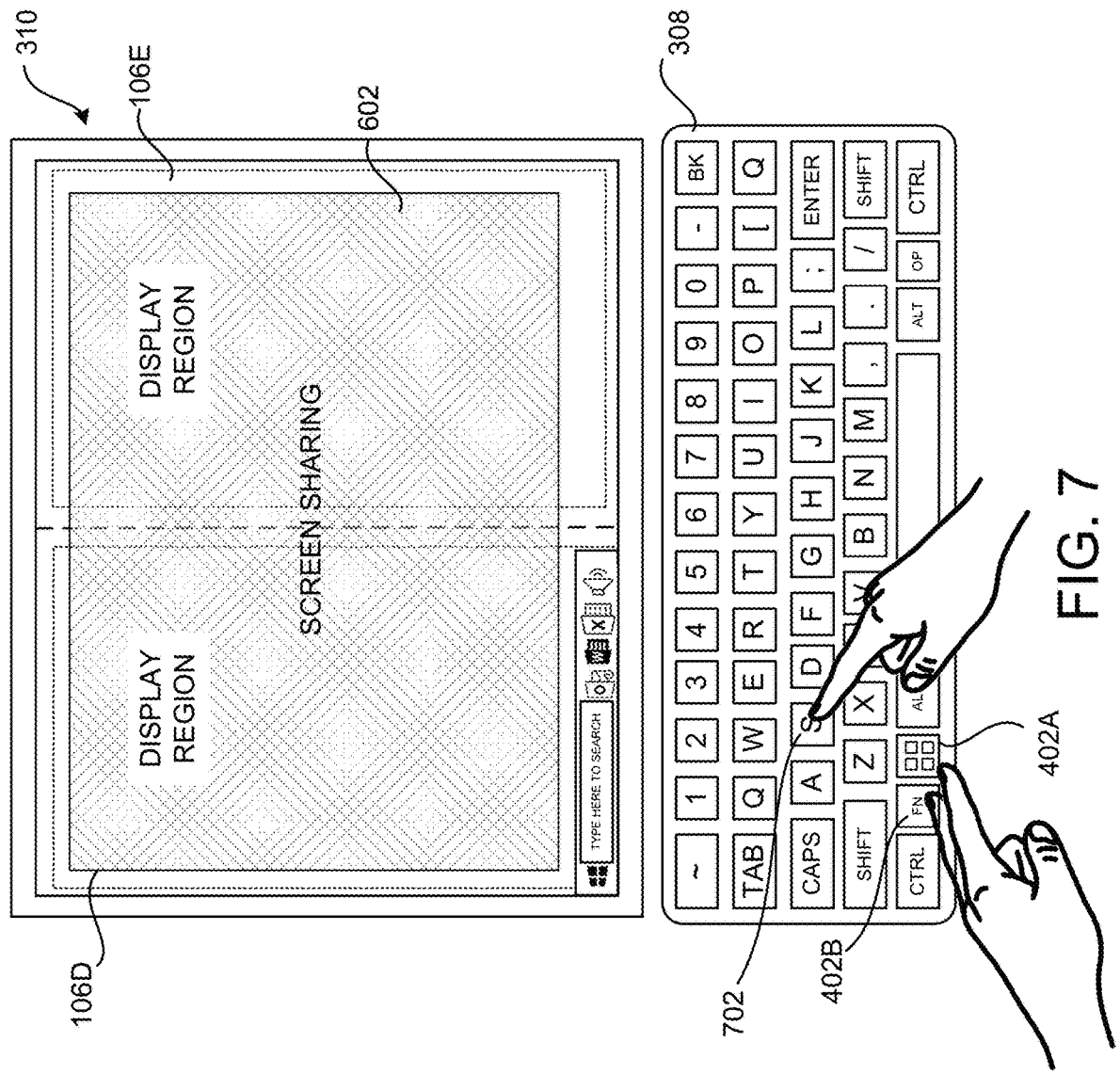

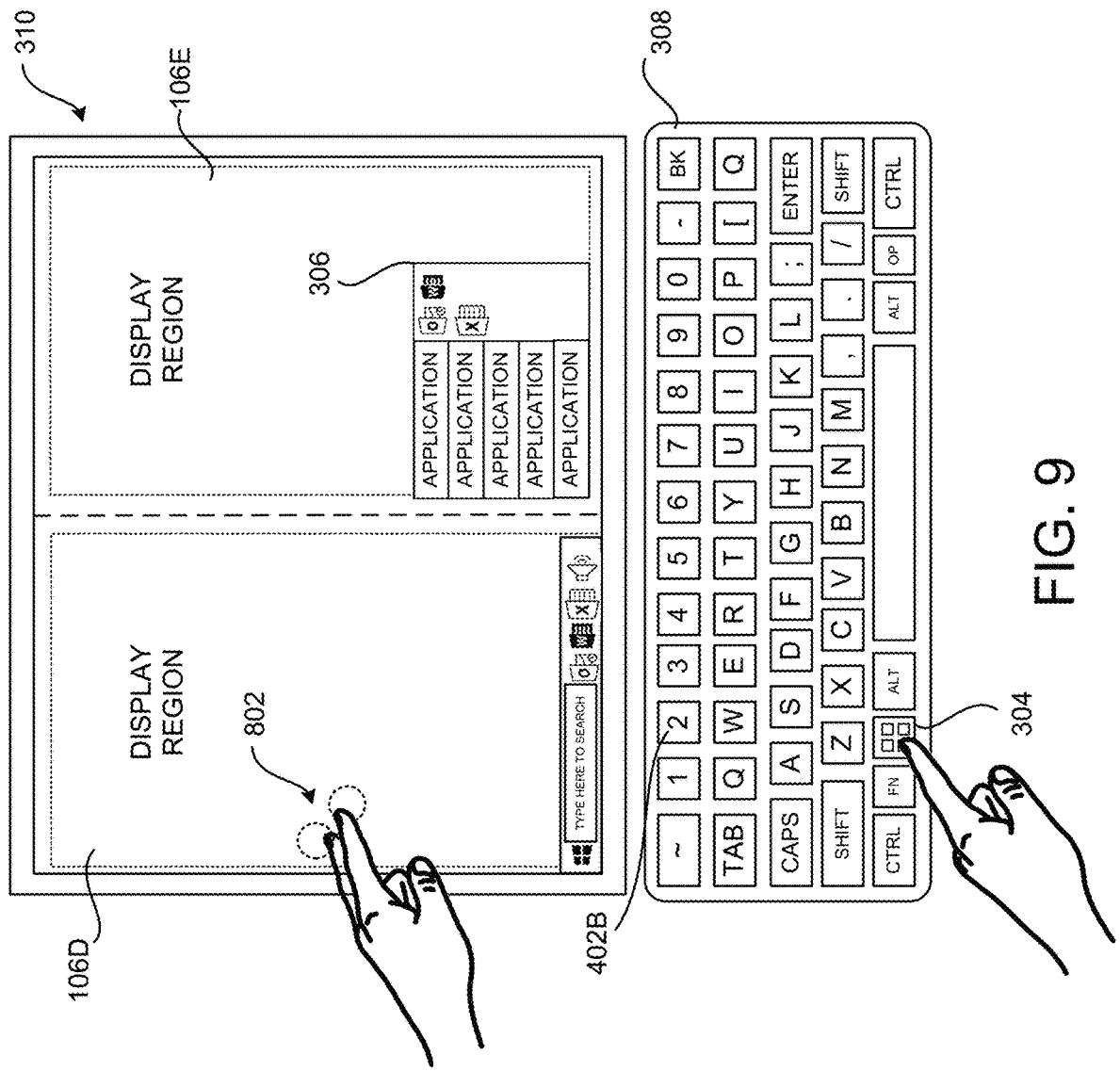

EXTENSIONS TO GLOBAL KEYBOARD SHORTCUTS FOR COMPUTING DEVICES HAVING MULTIPLE DISPLAY REGIONS

CROSS-REFERENCE TO RELATED APPLICATIONS

This application claims priority to U.S. Provisional Patent Application No. 62/909,181, entitled "EXTENSIONS TO GLOBAL KEYBOARD SHORTCUTS FOR COMPUTING DEVICES HAVING MULTIPLE DISPLAY REGIONS," which was filed on Oct. 1, 2019, and which is expressly incorporated herein by reference in its entirety.

BACKGROUND

Global keyboard shortcuts are keystrokes, or combinations of keystrokes, that are interpreted at the operating system level and that initiate a command. For example, and without limitation, some computing systems executing the MICROSOFT WINDOWS operating system ("WINDOWS") are configured with a virtual or physical keyboard that includes a dedicated global shortcut key (i.e. the "WINDOWS key") for initiating commands called global keyboard shortcuts. When the WINDOWS key is pressed and released, a "start menu" for launching applications and performing other types of functionality is presented. Other types of computing devices executing other types of operating systems might include a similar dedicated key for performing other types of global keyboard shortcuts.

Global keyboard shortcuts are reserved for operating system use and cannot be utilized by applications without the operating system acting as an intermediary. For instance, a user might be actively working in an application and initiate a global keyboard shortcut using an appropriate global keyboard shortcut key. The key press will be processed by the operating system and will not, and cannot, be processed by the application. As a result, global keyboard shortcuts can be utilized regardless of the application context and provide a consistent result.

Global keyboard shortcuts cannot, however, initiate commands within a particular display region on a computer supporting multiple display regions, such as foldable computing devices. As a result, users might have to perform various other actions in order to perform a command on a specific display region.

As one specific example, on a computer executing the WINDOWS operating system, the key combination WINDOWS key+R will cause a user interface ("UI") dialog box for running a command to be displayed. The UI dialog box will be presented only in the default display region (i.e. the display region showing a taskbar). A user must drag and drop the UI dialog box to another display region in order to execute the command in the other display region. This results in additional processing by the computing device (e.g. displaying a UI dialog box as it is dragged across the screen, or screens) and, therefore, consumes additional processing cycles, memory, power, etc. The technologies disclosed herein address these and potentially other technical considerations.

It is with respect to these and other technical challenges that the disclosure made herein is presented.

SUMMARY

Technologies are disclosed herein for providing extensions to global keyboard shortcuts for computing devices having multiple display regions. The disclosed technologies address the technical problems described above, and potentially others, by extending global keyboard shortcuts to target a display region, or regions, specified by a user. Implementations of the disclosed technologies can enable users of computing devices supporting multiple display regions to work more efficiently and, therefore, reduce the utilization of computing resources as compared to previous solutions. For instance, the computing resources that would be used by previous solutions when moving a UI dialog box from one display region to another display region will be conserved. Other technical benefits not specifically mentioned herein can also be realized through implementations of the disclosed subject matter.

According to various embodiments disclosed herein, a computing device supporting multiple display regions, such as a foldable computing device, can implement global keyboard shortcuts targeting a specific display region using repeated key presses. In particular, a computing device can detect a first press and release of a global shortcut key with or without the simultaneous selection of a modifier key. In response thereto, the computing device can initiate an operation in a first display region provided by the computing device. For instance, the computing device might display a UI element in the first display region. The first display region might be a default display region.

The computing device can also detect a second press and release of the global shortcut key within a predetermined period of time following the detection of the first press and release of the global shortcut key. Responsive to detecting the second press and release of the global shortcut key with or without the simultaneous selection of a modifier key, the computing device can cancel an operation previously initiated in a first display region and initiate the operation (e.g. displaying a UI element) in a second display region provided by the computing device. The second display region might be a non-default display region.

The disclosed computing device might also, or alternately, implement global keyboard shortcuts targeting a specific display region using chorded modifier keys. For example, and without limitation, the computing device might detect a press of a global shortcut key simultaneously with a press of a first modifier key. Responsive to detecting the press of the global shortcut key simultaneously with the press of the first modifier key, the computing device can initiate an operation (e.g. displaying a UI element) in a first display region provided by the computing device. The first display region might be a default display region.

The computing device might also detect a press of the global shortcut key simultaneously with a press of a second modifier key. In response thereto, the computing device can initiate the operation in a second display region. The second display region might be a non-default display region.

The disclosed computing device might also, or alternately, implement global keyboard shortcuts targeting a specific display region using a single modifier key. In this embodiment, the computing device can detect a press of a global shortcut key simultaneously with a press of a modifier key. In response thereto, the computing device can initiate an operation in a non-default display region provided by the computing device. Initiating the operation might include displaying a UI element in the non-default display region.

The disclosed computing device might also, or alternately, implement global keyboard shortcuts targeting a specific display region based on user activity. For example, the computing device might detect user activity on the computing device such as, for example, providing user input to a display region, launching an application in a display region, or specifying a preference that operations are to be initiated in a certain display region. When the computing device detects the press of a global shortcut key, the computing device can select a display region based on the detected user activity. The computing device can then initiate the requested operation in the selected display region.

The disclosed computing device might also, or alternately, implement global keyboard shortcuts targeting multiple display regions simultaneously. In particular, the computing device might detect a press of a command key simultaneously with a press of one or more modifier keys. Responsive thereto, the computing device can initiate an operation in multiple display regions provided by the computing device simultaneously. For example, the computing device might perform a screen-sharing operation for sharing a region that encompasses multiple display regions.

The disclosed computing device might also, or alternately, implement global keyboard shortcuts targeting a specific display region using multi-modal input. For example, the computing device might detect non-keyboard input such as, but not limited to voice input, touch input made to a display screen of the computing device, the hinge angle of the computing device, or a posture of the computing device. The computing device can select a display region based upon the non-keyboard input or keyboard input. For instance, when the computing device detects the press of a global shortcut key, the computing device can initiate an operation in the display region that was selected based on non-keyboard input (e.g. a touch gesture). In another example, the computing device might select the display region for initiating a command based upon a key press and perform a command in that display region that is spoken by a user. Other types of global keyboard shortcuts for targeting specific display regions might also be provided by other embodiments.

It should also be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 3A and 3B are device user interface diagrams illustrating aspects of an illustrative global keyboard shortcut targeting a specific display region using repeated key presses, according to one embodiment;

FIG. 7 is a device user interface diagram showing aspects of an illustrative global keyboard shortcut that targets multiple display regions, according to one embodiment;

FIG. 9 is a device user interface diagram showing aspects of another illustrative global keyboard shortcut that targets a specific display region using multi-modal input, according to one embodiment;

DETAILED DESCRIPTION

Figure 1B:
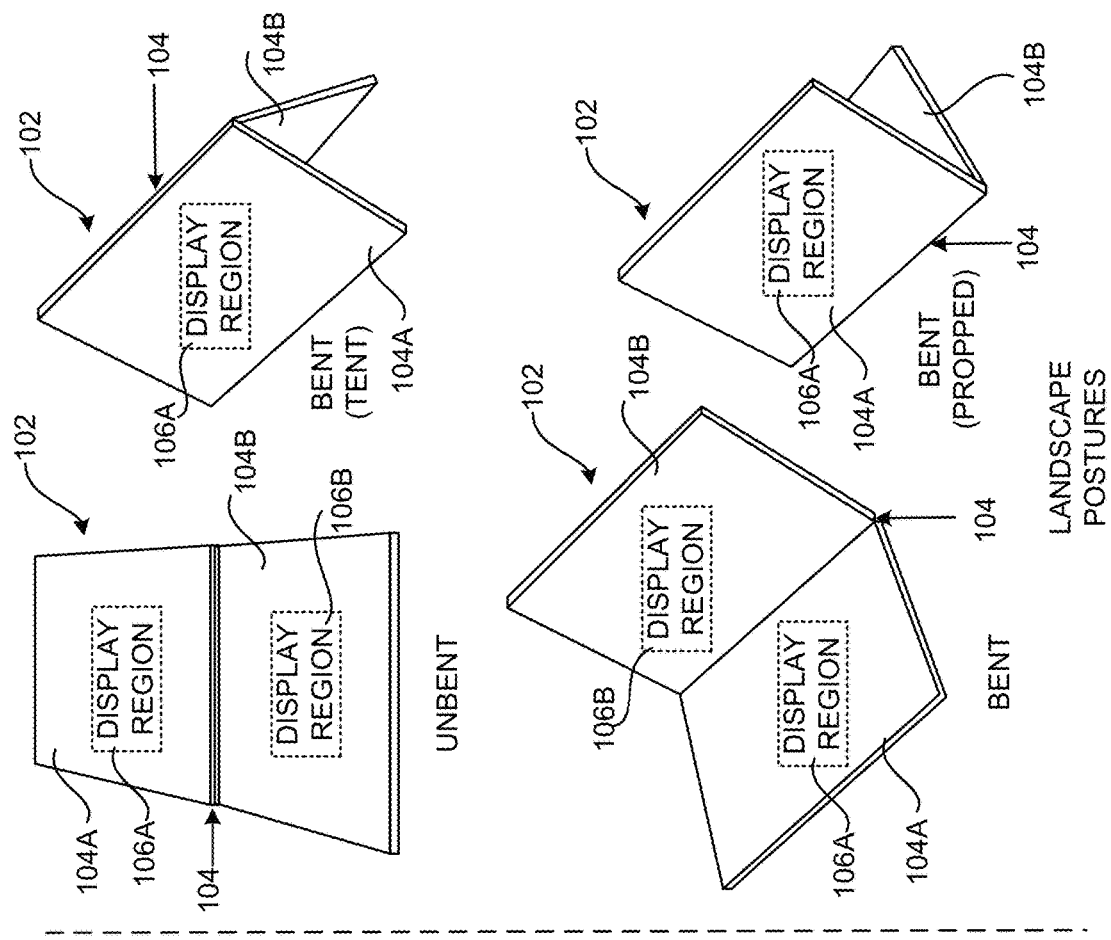
FIGS. 1A and 1B are device posture diagrams illustrating aspects of the configuration and operation of a hinged computing device that implements the disclosed technologies in one particular configuration.

The following detailed description is directed to technologies for providing extensions to global keyboard shortcuts for computing devices having multiple display regions. As discussed briefly above, implementations of the disclosed technologies can extend global keyboard shortcuts to target a display region, or regions, specified by a user. Consequently, the utilization of computing resources associated with reconfiguration of a UI following utilization of a global keyboard shortcut supporting only a single display region can be reduced or eliminated. Other technical benefits not specifically mentioned herein can also be realized through implementations of the disclosed subject matter.

Those skilled in the art will recognize that the subject matter disclosed herein can be implemented with various types of computing systems and modules, at least some of which are described in detail below. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearables, automobiles, home automation etc.), computing or processing systems embedded in devices (such as wearable computing devices, automobiles, home automation etc.), and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for providing extensions to global keyboard shortcuts for computing devices having multiple display regions will be described.

Prior to discussing particular aspects of the disclosed technologies, a brief introduction to foldable computing devices (which might be referred to herein as "foldable devices") will be provided. In this regard, it is to be appreciated that while the embodiments presented herein are primarily discussed in the context of foldable devices, the technologies disclosed herein can also be utilized with other types of computing devices providing multiple display regions (e.g. a desktop computer connected to two display screens).

As discussed briefly above, foldable devices include multiple screen form factor devices (which might be referred to herein as "hinged devices") that have two physical display screens joined together with a hinge or other equivalent mechanism. By manipulating the orientation of the display screens with respect to one another by way of the hinge, such devices can be configured in a multitude of postures, some of which are described in greater detail below with regard to FIGS. 1A and 1B.

Foldable devices also include computing devices having a bendable display screen (which might be referred to herein as "bendable devices"), such as computing devices utilizing flexible screen technology. When such a device is not bent, it presents a single display surface. When bent, these devices present a single display surface with a crease in the middle. Bendable devices can also be configured in a multitude of postures by varying the amount of bend, some of which are also described in greater detail below with reference to FIGS. 2A-2C.

The display screens of foldable computing devices can be touch sensitive, thereby enabling such devices to recognize touch or stylus input, presses, swipes, and other types of gestures, some of which are described below. These devices can also, of course, be used while being held in various orientations, some of which are described below with regard to FIGS. 1A and 1B.

Figure 1A:
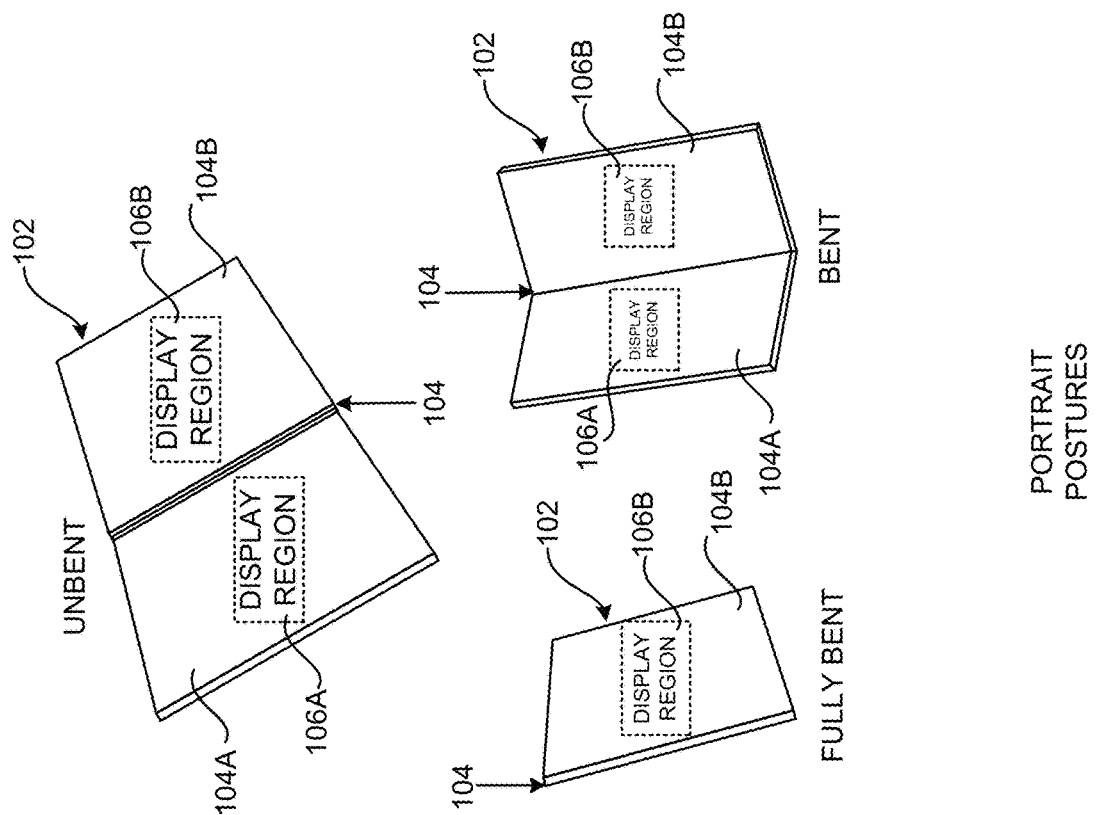

Referring now to FIGS. 1A and 1B, details regarding several postures for foldable display devices will be described. In particular, the examples shown in FIGS. 1A and 1B illustrate some possible postures for a hinged device 102. It is to be appreciated, however, that the illustrated postures generally apply to bendable devices as well.

As shown in FIG. 1A, a hinged device 102 can be configured in multiple postures by varying the angle of the hinge 104 that connects two display devices 104A and 104B (which might be referred to herein as "displays"). In FIG. 1A, for instance, the hinged device 102 is shown in a flat posture where the display screens 104A and 104B are parallel to one another in portrait orientation, a completely open posture where only a single display 104B is visible in portrait orientation, and a partially open posture in portrait orientation where the hinge 104 is partially bent. The hinged device 102 can also be configured in a closed posture (not shown) where neither display screen is visible.

In FIG. 1B, the hinged device 102 is shown in a flat posture where the display screens 104A and 104B are in landscape orientation, in tented and propped postures where the angle of the hinge 104 enables the hinged device 102 to stand on its own and present a single display 104A, and in a partially open posture where one display 104A is flat and the other display 104B is at least partially upright, thereby forming a configuration similar to a traditional laptop computer. In this regard, it is to be appreciated that the postures illustrated in FIGS. 1A and 1B are illustrative and that other postures might also be possible.

As also shown in FIGS. 1A and 1B, the display device 104A provides a first display region 106A that encompasses all or a part of the display 104A. Similarly, the display device 104B provides a second display region 106B that encompasses all or a part of the display 104B. The first display region 106A and the second display region 106B can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. Various uses of the display regions 106A and 106B provided by the hinged device 102 will be described below.

Figure 2B:
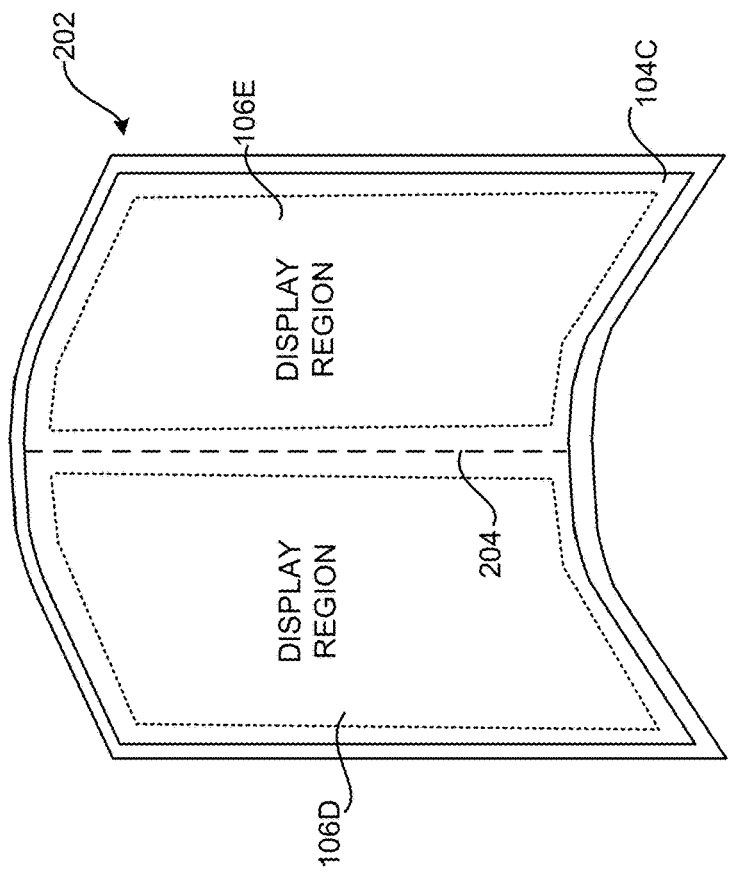
FIGS. 2A-2C are device posture diagrams illustrating aspects of the configuration and operation of a bendable computing device that implements the disclosed technologies in one particular configuration.
Figure 2A:
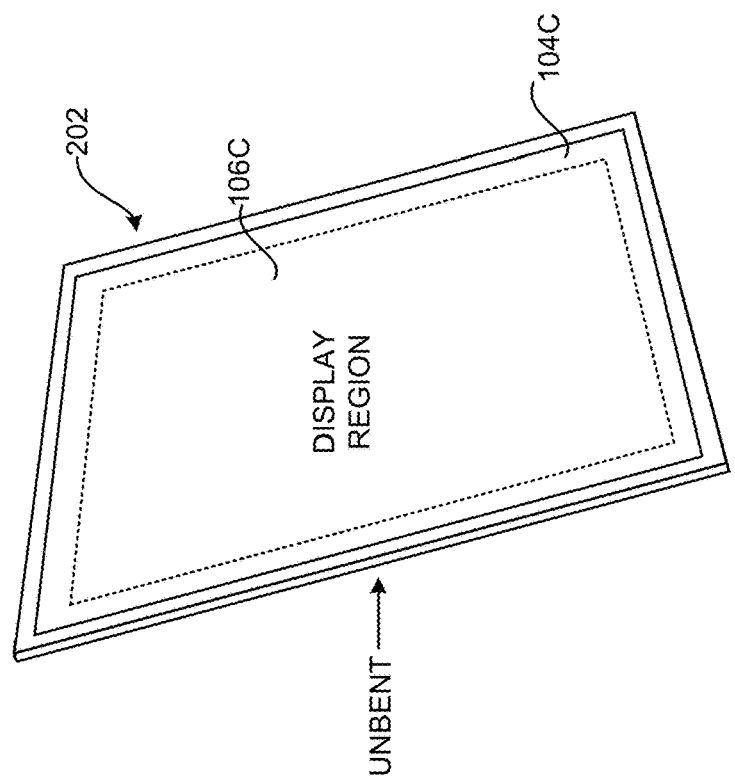
Figure 2C:
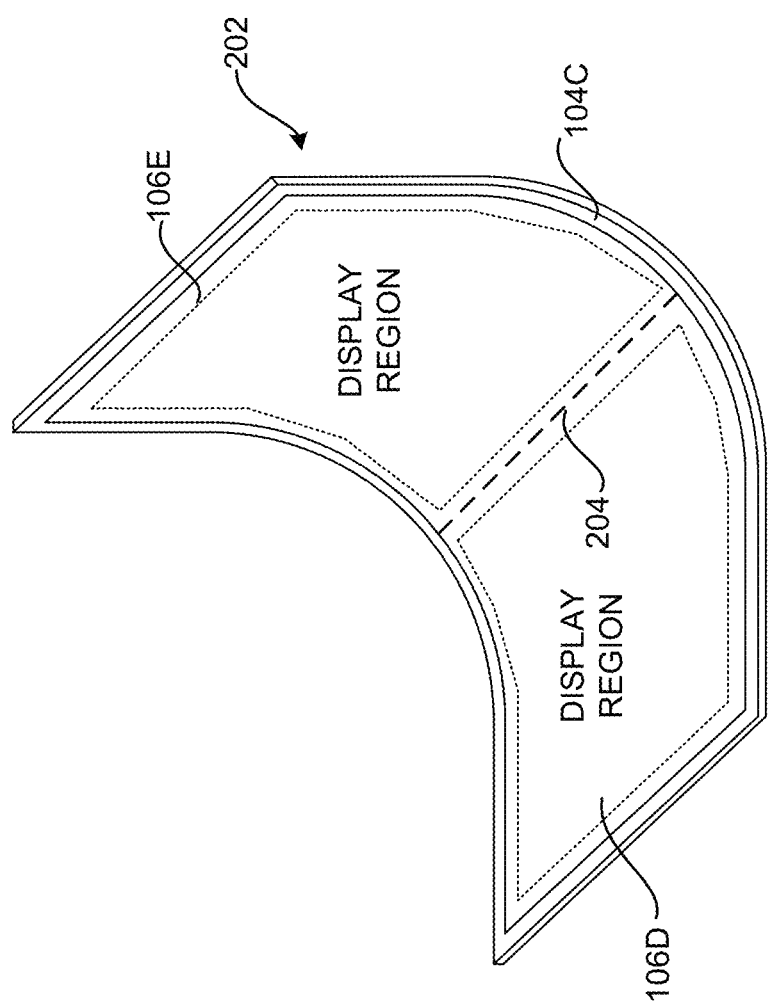

Referring now to FIGS. 2A-2C, details will be provided regarding the configuration and operation of a bendable device 202. As mentioned above, a bendable device 202 can also be configured in postures the same as or similar to those described above with regard to FIGS. 1A and 1B. For instance, in the example posture shown in FIG. 2B, the bendable device 202 has been placed in an unbent position, thereby presenting the entirety of the display 104C. The bendable device 202 can also be configured in a closed posture where neither display screen is visible (not shown in the FIGS).

In the example posture shown in FIGS. 2B and 2C, the bendable device 202 has been partially bent similar to the partially open posture shown in FIGS. 1A and 1B. In particular, in the example shown in FIG. 2B, the bendable device 202 has been bent while the screen 104C is in a landscape orientation. In the example shown in FIG. 2C, the device 202 has been bent while the screen 104C is in portrait orientation.

When the bendable device 202 is bent, a crease or "fold" 204 is formed in the display 104C. The term "fold" as used herein refers to the area where a foldable device is folded (i.e. the area of a hinge 104 on a hinged device 102 or the area where the display of a bendable device 202 bends).

As in the case of a hinged device 102, the bendable device 202 can also provide one or more display regions. However, in the case of a bendable device 202, the number of available display regions can vary based upon the posture of the device. For instance, a single display region 106C is provided when the bendable device 202 is in an unbent state as shown in FIG. 2A. Two display regions 106D and 106E can be provided on the display 104C when the bendable device 202 is in a bent posture, such as that shown in FIG. 2B. Various details regarding the configuration and use of the display regions 106 (which are rendered using dotted lines throughout the FIGS.) provided by bendable devices 202 are provided below.

Figure 3B:
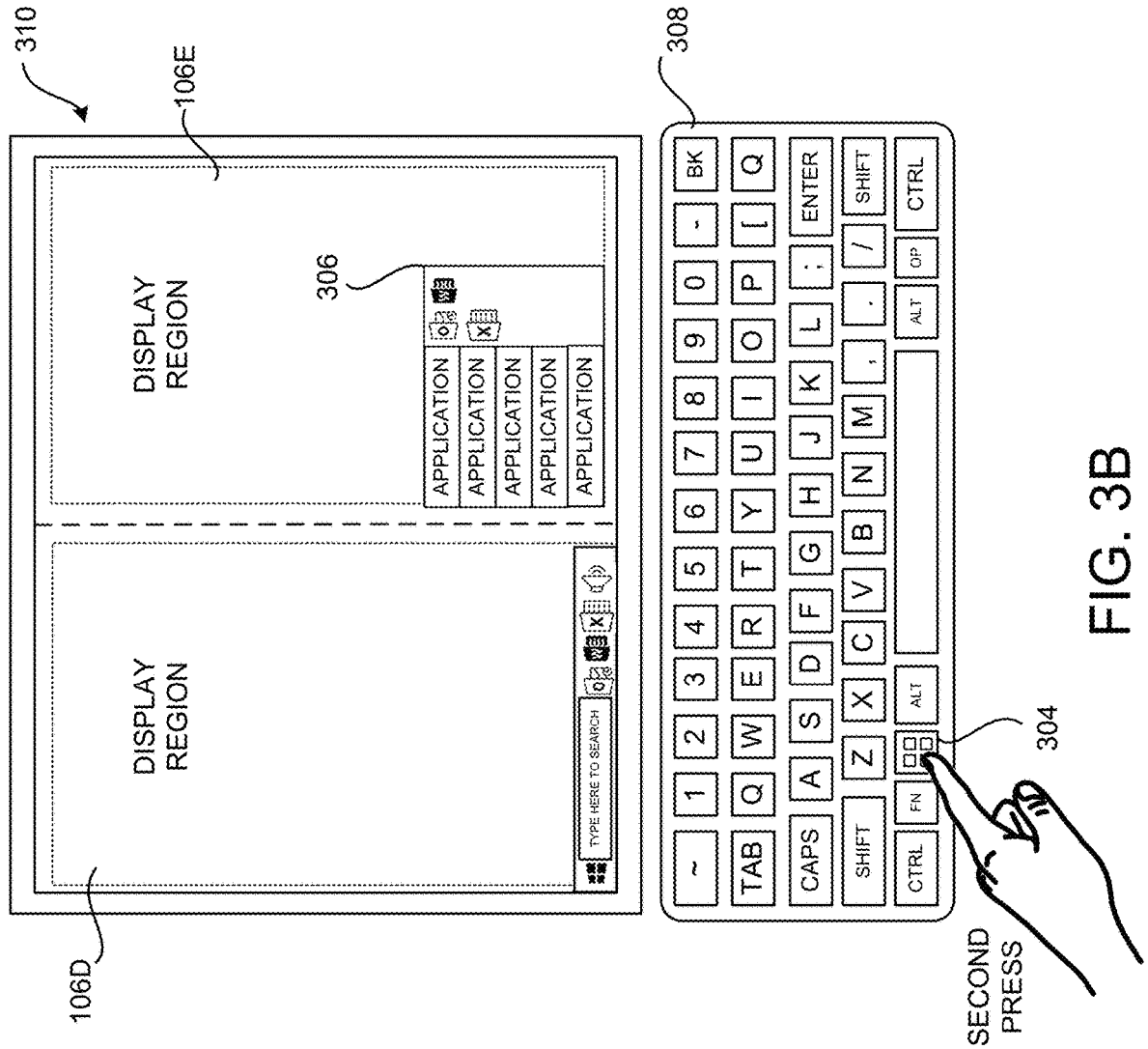

Prior to discussing FIGS. 3A and 3B, and the other FIGS, it is to be appreciated that certain relative terms (e.g. height, width, top, bottom, left, right) might be utilized herein to describe the configuration of the displays 104 and display regions 106 described herein. In this regard, it is to also be appreciated that these terms have been utilized herein for ease of discussion and are not to limit the configuration of the display regions or UI elements. Other terms can be utilized to describe the displays, display regions, UI elements, and their spatial relationships to one another It is also to be appreciated that although generally described separately, the various embodiments described briefly above and in further detail below can be utilized in combination with one another.

It is to be further appreciated that the foldable device 310 shown in FIGS. 3A and 3B (and FIGS. 4A-9) has been shown two-dimensionally for ease of illustration. In these FIGS, the foldable device 310 might by lying flat, be in a bent posture such as that shown in FIG. 2B, or another posture where two or more display regions 106 are shown.

As described briefly above, a foldable device 310 might behave as a dual screen device and provide multiple display regions 106D and 106E. In the illustrated example, the display region 106D encompasses the entirety of the left side of the foldable device 310 and the display region 106E encompasses the entirety of the right side of the foldable device 310. This interaction mode might be referred to herein as "multiple display region mode."

As also described briefly above, various types of computing devices, such as the foldable device 310, implement global keyboard shortcuts. Global keyboard shortcuts are keystrokes, or combinations of keystrokes, that are interpreted at the operating system level and that initiate a command. For example, and without limitation, some computing systems executing the MICROSOFT WINDOWS operating system ("WINDOWS") are configured with a keyboard that includes a dedicated global shortcut key (i.e. the "WINDOWS key") for initiating global keyboard shortcuts. When the WINDOWS key is pressed and released, a "start menu" for launching applications and performing other types of functionality is presented. Other types of functionality can be initiated by holding the WINDOWS key while one or more other keys are pressed. Other types of computing devices executing other types of operating systems might include a similar dedicated key, or keys, for performing other types of global keyboard shortcuts.

Global keyboard shortcuts are reserved for operating system use and cannot be directly utilized by applications without the operating system acting as an intermediary. For instance, a user might be actively working in an application and initiate a global keyboard shortcut by pressing a dedicated global shortcut key, or keys. The key press will be processed by the operating system, not the application. As a result, global keyboard shortcuts can be utilized regardless of the application context and provide a consistent result.

As discussed above, global keyboard shortcuts are not multi-screen aware. Consequently, these shortcuts cannot initiate commands within a user-specified display region on a computer supporting multiple display regions. As a result, users might have to perform various other actions in order to perform a command on a specific display region.

For example, and without limitation, on a computer executing the WINDOWS operating system, certain global keyboard shortcuts will result in the presentation of a UI dialog box for performing certain types of functionality. In these cases, the UI dialog box will be presented in the default display region (i.e. the display region showing a taskbar, or the display region specified as primary). The user must then drag and drop the UI dialog box to another display region if the user wants to utilize the functionality in the other display region. This results in additional processing by the computing device (e.g. animating the movement of a UI dialog box) and, therefore, consumes processing cycles, memory, power, etc. The technologies disclosed herein address these and potentially other technical problems.

In order to address the technical problems described above, and potentially others, the technologies disclosed herein provide extensions to global keyboard shortcuts for computing devices having multiple display regions, such as the foldable computing devices described above. In particular, the extended global keyboard shortcuts disclosed herein can be used to initiate system functionality such as launching operating system shell UI surfaces on specific display regions.

Using the disclosed technologies, for example, a user might initiate a global keyboard shortcut for instantiating the start menu provided by the WINDOWS operating system on a non-default or specific display region. It is to be appreciated in this regard that while several of the embodiments disclosed herein are presented in the context of the start menu provided by the WINDOWS operating system, the technologies disclosed herein can be utilized to initiate various other types of functionality in one or more display regions on WINDOWS-based computing systems and computing systems executing other operating systems.

Targeting a Specific Display Region Using Repeated Key Presses

FIGS. 3A and 3B are device user interface diagrams illustrating aspects of an illustrative global keyboard shortcut targeting a specific display region using repeated key presses, according to one embodiment. In this embodiment, repeated key presses of a global shortcut key 304 on a keyboard 308 (e.g. the WINDOWS key on certain keyboards) will initiate an operation in a display region 106 other than the default display region (e.g. the display region 106 showing the taskbar on a WINDOWS-based computer).

In the example shown in FIGS. 3A and 3B, for instance, the first press and release of the global shortcut key 304 (shown in FIG. 3A) will cause the start menu 306 to be displayed in the default display region 106D. A subsequent press of the global shortcut key 304 within a predetermined period of time (shown in FIG. 3B) will cause the start menu 306 to be displayed in another, non-default, display region 106E. As discussed above, the same mechanism can be utilized to initiate other types of functionality in a non-default display region 106E.

Additionally, pressing a modifier key (i.e. a key pressed while the global shortcut key is also pressed) while the global shortcut key 304 is held can also be utilized to enable the functionality described above. In this regard, it is to be appreciated that for other commands that require two or more keys, there can be two different possible patterns: either pressing the modifier key multiple times and pressing the second key while the modifier is pressed; or keeping the modifier key pressed once while pressing the second key repeatedly.

Targeting a Specific Display Region Using Chorded Modifiers

Figure 4A:
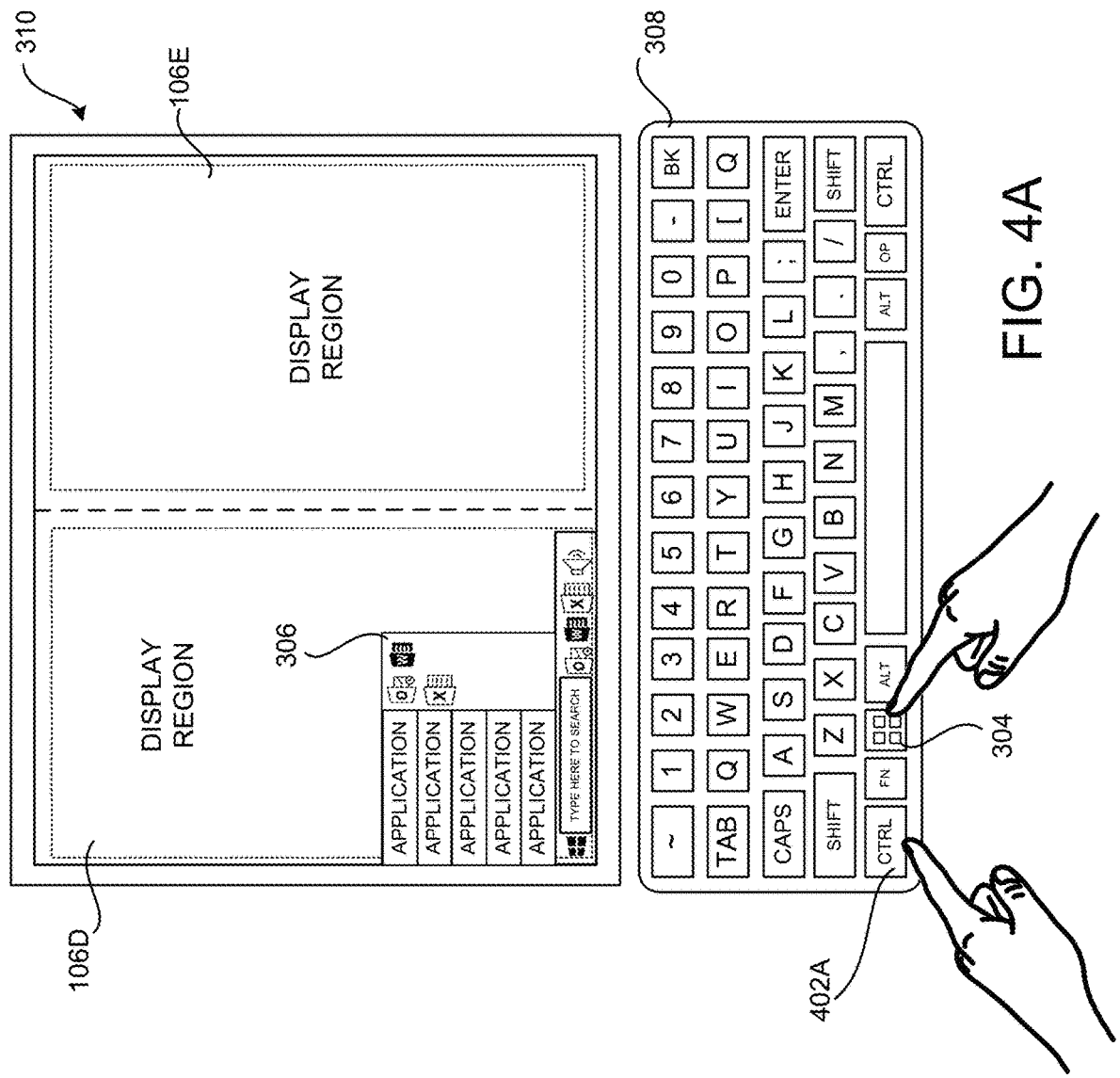
FIGS. 4A and 4B are device user interface diagrams showing aspects of an illustrative global keyboard shortcut that targets a specific display region using chorded modifiers, according to one embodiment.
Figure 4B:
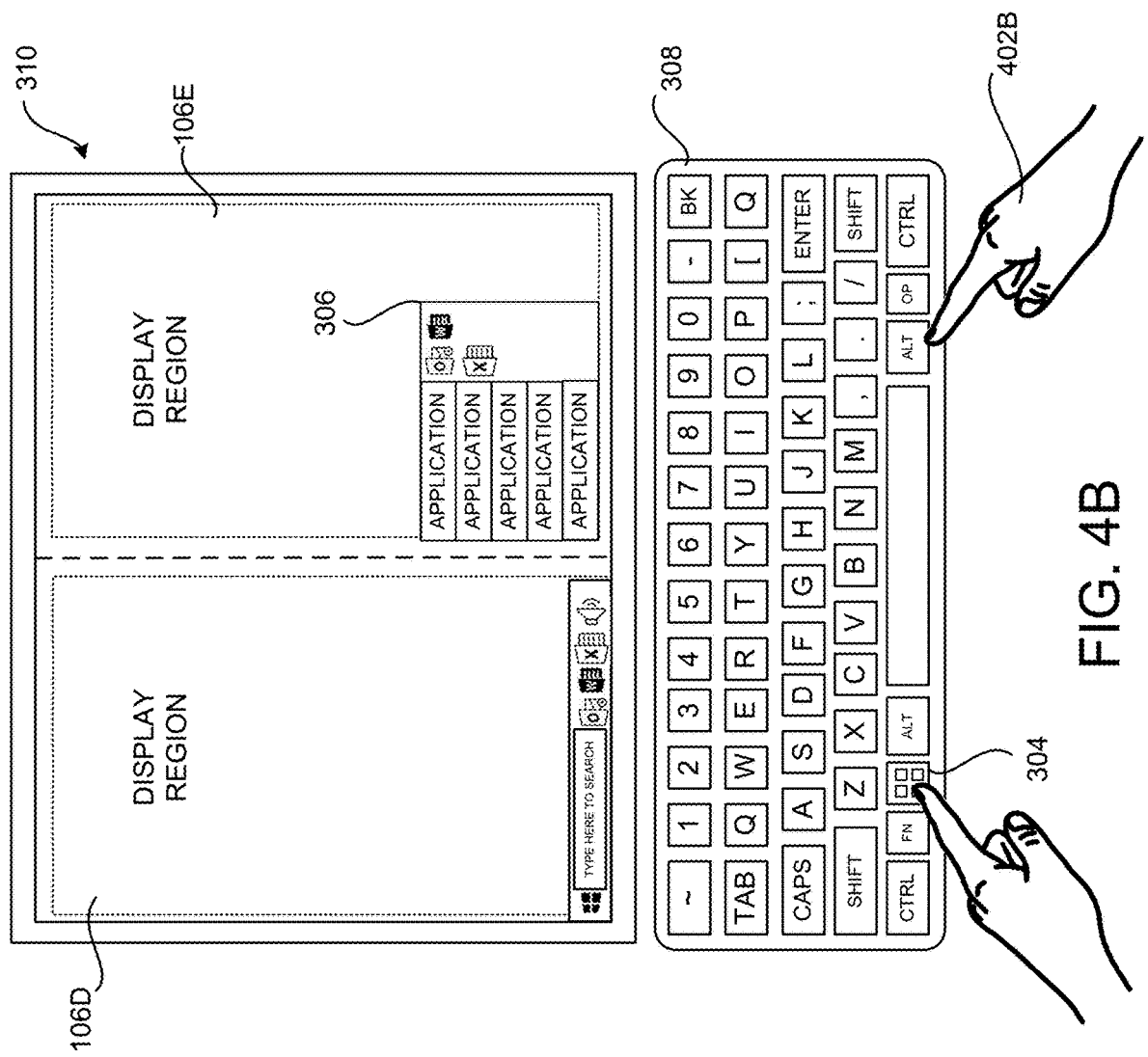

FIGS. 4A and 4B are device user interface diagrams showing aspects of an illustrative global keyboard shortcut that targets a specific display region 106 using chorded modifiers, according to one embodiment. In this example, simultaneous presses of the global shortcut key 304 and one or more other keys on the keyboard 308 can initiate an operation in a particular display region 106.

In the example shown in FIGS. 4A and 4B, a single modifier key 402 is assigned to each available display region 106. In particular, the modifier key 402A (the 'control' key in this example) has been assigned to the display region 106D and the modifier key 402B (the 'alt' key in this example) has been assigned to the display region 106E.

As shown in FIG. 4A, simultaneously pressing the global shortcut key 304 and the modifier key 402A will cause an associated operation (presentation of the start menu 306 in this example) to be initiated in the display region 106D As shown in FIG. 4B, simultaneously pressing the global shortcut key 304 and the modifier key 402B will cause an associated operation (presentation of the start menu 306 in this example) to be initiated in the display region 106E. In this manner, a user can directly specify the particular display region 106 upon which an operation is to be initiated.

Targeting a Specific Display Region Using a Single Modifier

Figure 5:
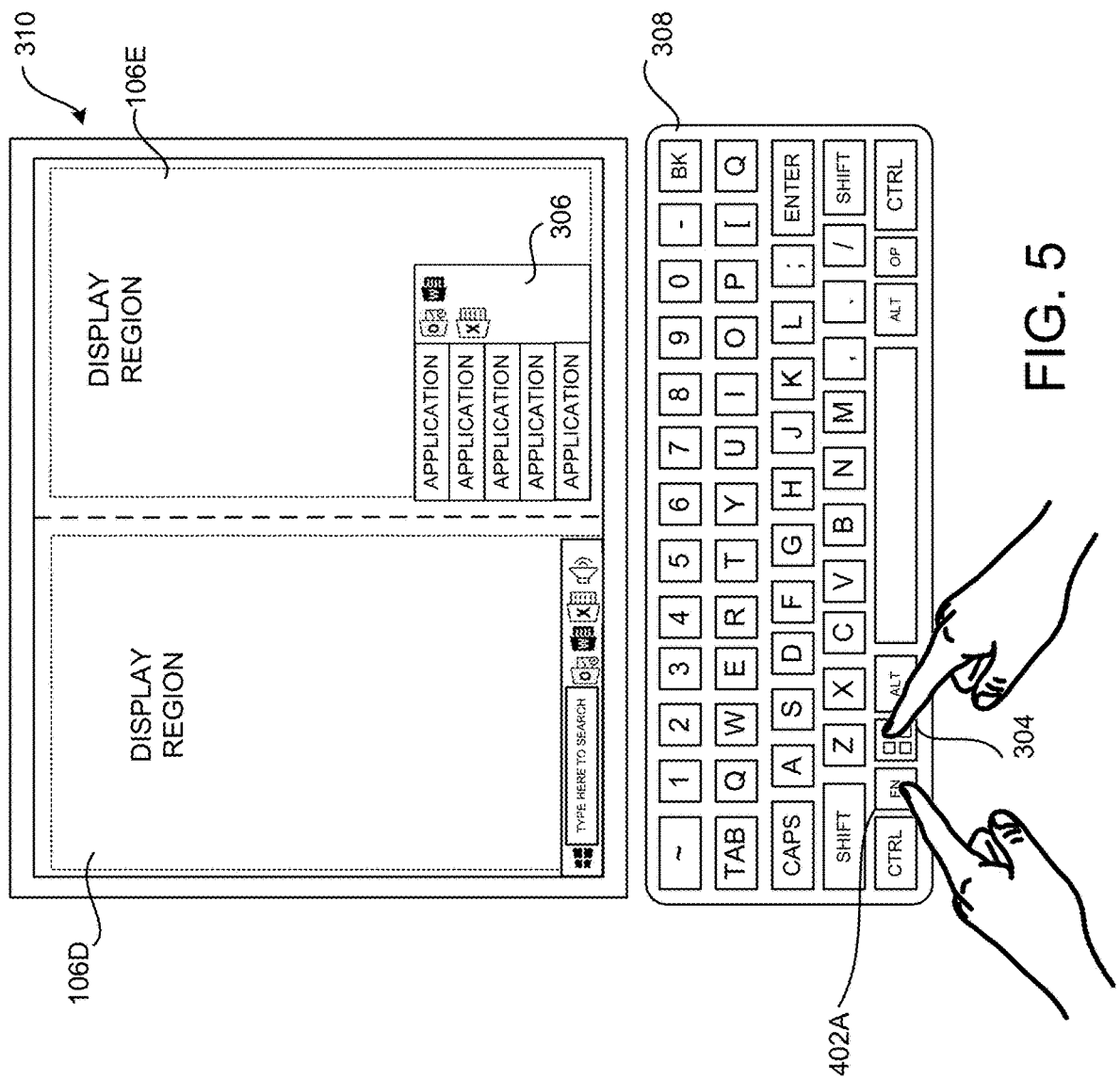
FIG. 5 is a device user interface diagram showing aspects of an illustrative global keyboard shortcut that targets a specific display region using a single modifier, according to one embodiment.

FIG. 5 is a device user interface diagram showing aspects of an illustrative global keyboard shortcut that targets a specific display region 106 using a single modifier key, according to one embodiment. In this embodiment, the global shortcut key 304 can be utilized in combination with a single modifier key 402A to initiate an operation on a secondary or non-default display region 106. For instance, in the example shown in FIG. 5, a press of the global shortcut key 304 and the modifier key 402A (the 'function' key in this example) will cause an operation (display of the start menu 306) in this case, to be initiated in the non-default display region 106E.

The mechanism shown in FIG. 5 can also be utilized in combination with the mechanism shown in FIGS. 3A and 3B. In particular, repeated presses of the modifier key 402A while the global shortcut key 304 is held will initiate an operation in a display region 106 other than the default display region (e.g. the display region 106 showing the start menu on a WINDOWS-based computer). For instance, the first press and release of the global shortcut key 304 while the modifier key 402A is held might cause the start menu 306 to be displayed in the default display region 106D. A subsequent press of the modifier key 402A while the global shortcut key 304 is held within a predetermined period of time will cause the start menu 306 to be displayed in another, non-default, display region 106E. Yet another press of the modifier key 402A while the global shortcut key 304 is held might cause an operation to be initiated in another non-default display region. As discussed above, the same mechanism can be utilized to initiate other types of operations in default or non-default display regions.

The mechanism shown in FIG. 5 can also be utilized in combination with the mechanism shown in FIG. 7 and described below. In particular, a press of the modifier key 402A while the global short key 304 is held can initiate an operation that simultaneously targets all available screen regions 106 or a defined subset of screen regions 106 at the same time. This operation is an operation for sharing multiple screen regions 106 in one embodiment. This mechanism can also be utilized to specify that other types of operations be initiated simultaneously on all of the available display regions 106 or a subset of the available regions 106 in other embodiments. Additional details regarding this aspect will be provided below with regard to FIG. 7.

Figure 12:
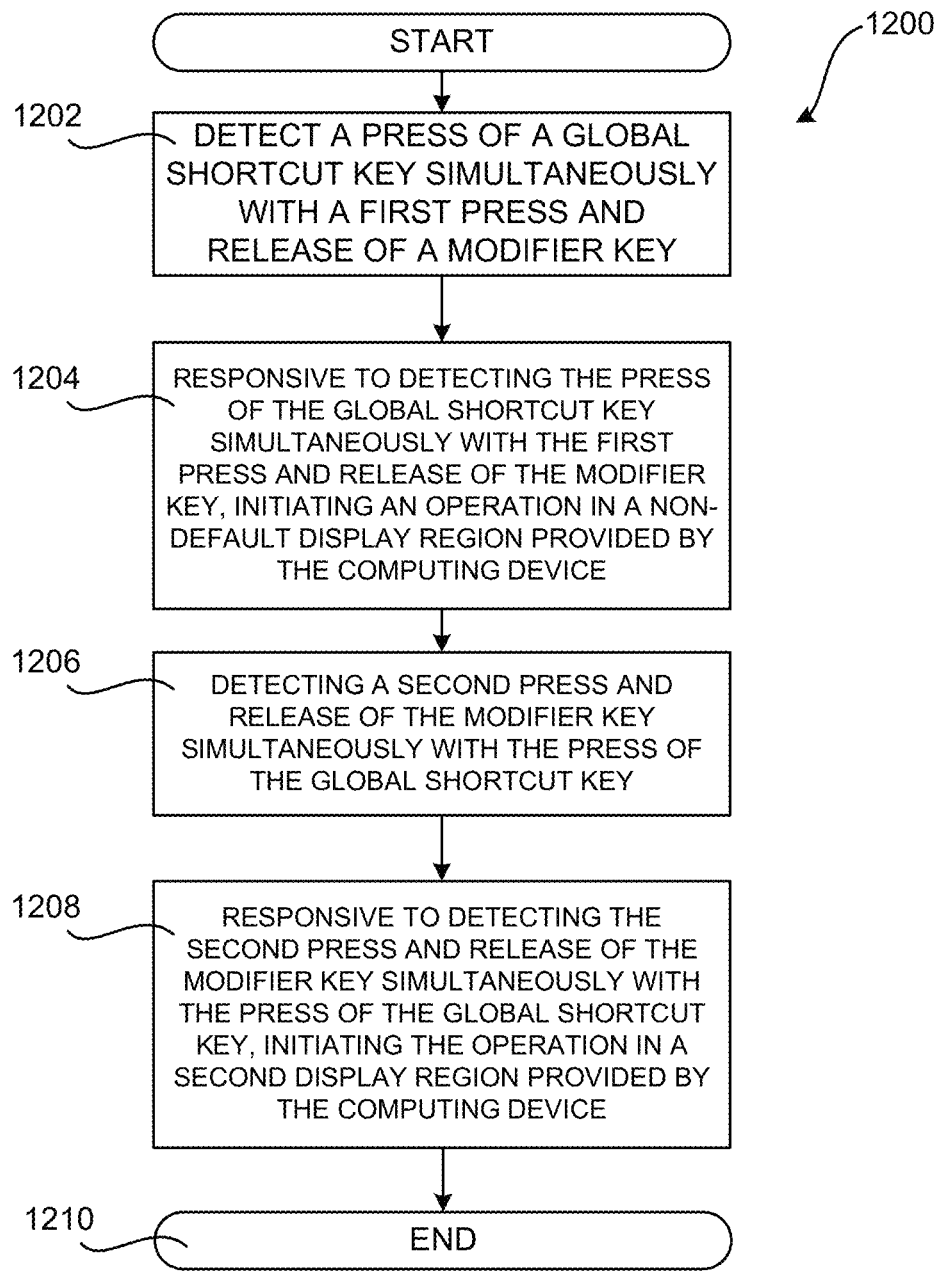
FIG. 12 is a flow diagram illustrating a routine for targeting a specific display region using a modifier key, according to one embodiment disclosed herein.

FIG. 12 is a flow diagram illustrating a routine 1200 for targeting a specific display region using a modifier key, according to one embodiment disclosed herein. The routine 1200 begins at operation 1202, where a computing device detects a press of a global shortcut key simultaneously with a first press and release of a modifier key. In response thereto, the routine 1200 proceeds to operation 1204, where an operation is initiated in a non-default display region. The operation might be displaying a user interface element in the non-default display region.

At operation 1206, the computing device detects a second press and release of the modifier key simultaneously with the press of the global shortcut key. In response thereto, the routine 1200 proceeds to operation 1208, where the operation can be initiated in a second display region, such as a default display region. The second press and release of the modifier key can be detected within a predetermined period of time following the detection of the first press and release of the modifier key. The operation might be simultaneously initiated in multiple display regions, such as sharing a region that encompasses the non-default display region and one or more other display regions. From operation 1208, the routine 1200 proceeds to operation 1210, where it ends.

Targeting a Specific Display Region Based on User Activity

Figure 6:
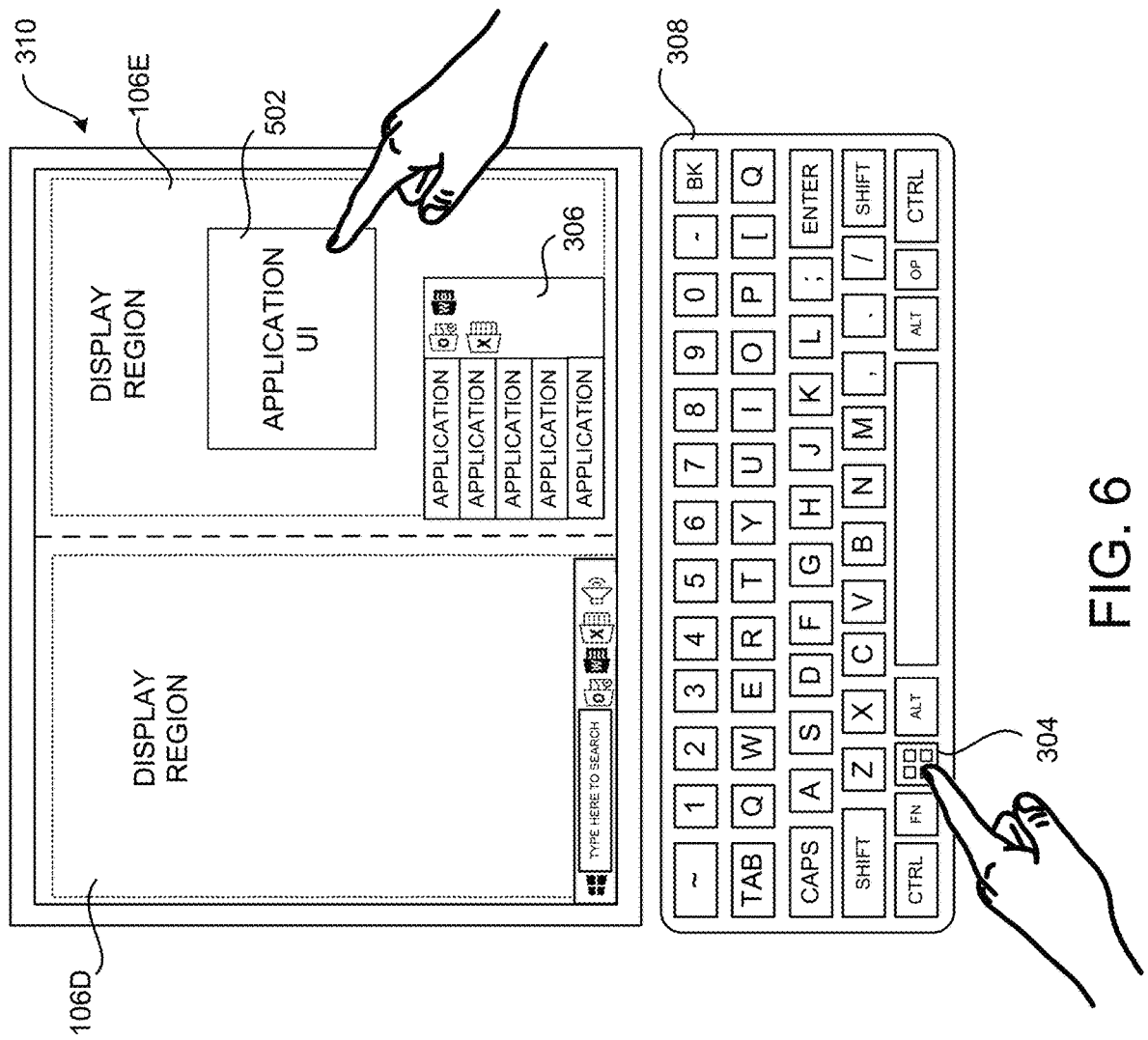
FIG. 6 is a device user interface diagram showing aspects of an illustrative global keyboard shortcut that targets a specific display region based on user activity, according to one embodiment.

FIG. 6 is a device user interface diagram showing aspects of an illustrative global keyboard shortcut that targets a specific display region 106 based on user activity, according to one embodiment. In this example, user activity, such as providing user input in a display region 106, launching an application in a particular display region 106, user preference settings (e.g. settings specifying which display region 106 operations are to be initiated in), or other types of activity can be utilized to select a display region 106 where an operation is to be initiated when the global shortcut key 304 is selected.

In the example shown in FIG. 6, for instance, a user has most recently provided input to an application UI 502 shown in the display region 106E. Consequently, when the global shortcut key 304 is selected, the associated operation (showing the start menu 306 in this case) is initiated in the display region 106E. If the most recent user input had been received in the display region 106D, the operation would have targeted that region.

In some embodiments, the foldable device 310 can determine that a user is currently engaged in a task flow that spans more than one application. Based on that determination, the foldable device 310 can predict that the next task the user is likely to perform will occur on a particular screen. For instance, if a user is utilizing an application that provides a companion experience to another application (e.g. two documents to be compared, a video game and a walkthrough video for the game, or help content for an application) a global keyboard shortcut can be provided that initiates an operation on the display region 106 showing the other companion application.

Targeting Multiple Display Regions

FIG. 7 is a device user interface diagram showing aspects of an illustrative global keyboard shortcut that targets multiple display regions 106, according to one embodiment. In this example, a single global keyboard shortcut can simultaneously target all available screen regions 106 or a defined subset of screen regions 106 at the same time.

In the example illustrated in FIG. 7, for instance, a key combination including a command key 702 (the 'S' key in this example) and two modifier keys 402A and 402B (the 'WINDOWS' and 'function' keys in this example) are selected in order to begin sharing of a region 602 that encompasses both display regions 106D and 106E. This mechanism can also be utilized to specify that other types of operations be initiated on all of the available display regions 106 or a subset of the available regions 106.

Targeting a Specific Display Region Using Multi-Modal Input

Figure 8A:
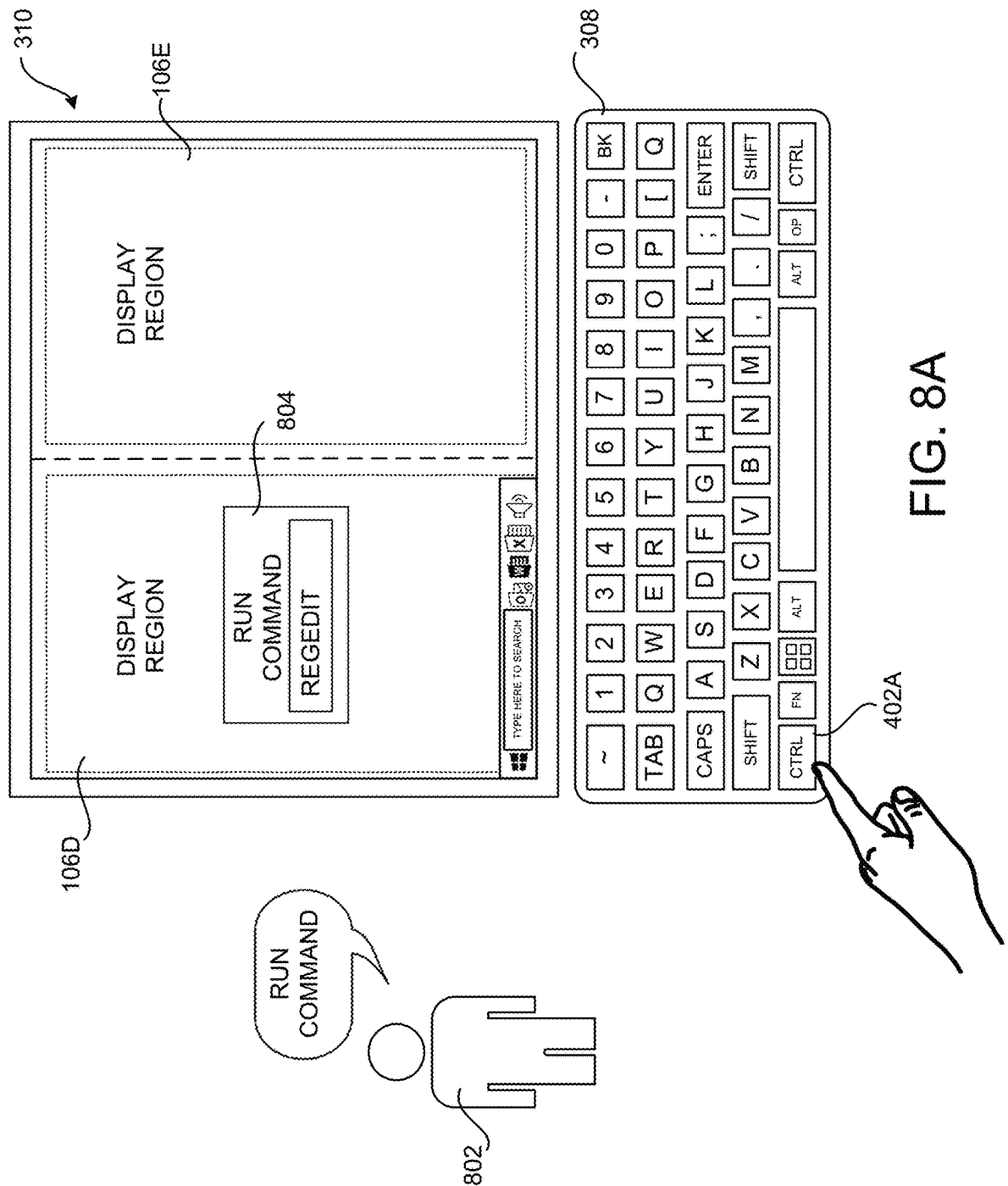
FIGS. 8A and 8B are device user interface diagrams showing aspects of an illustrative global keyboard shortcut that targets a specific display region using multi-modal input, according to one embodiment.
Figure 8B:
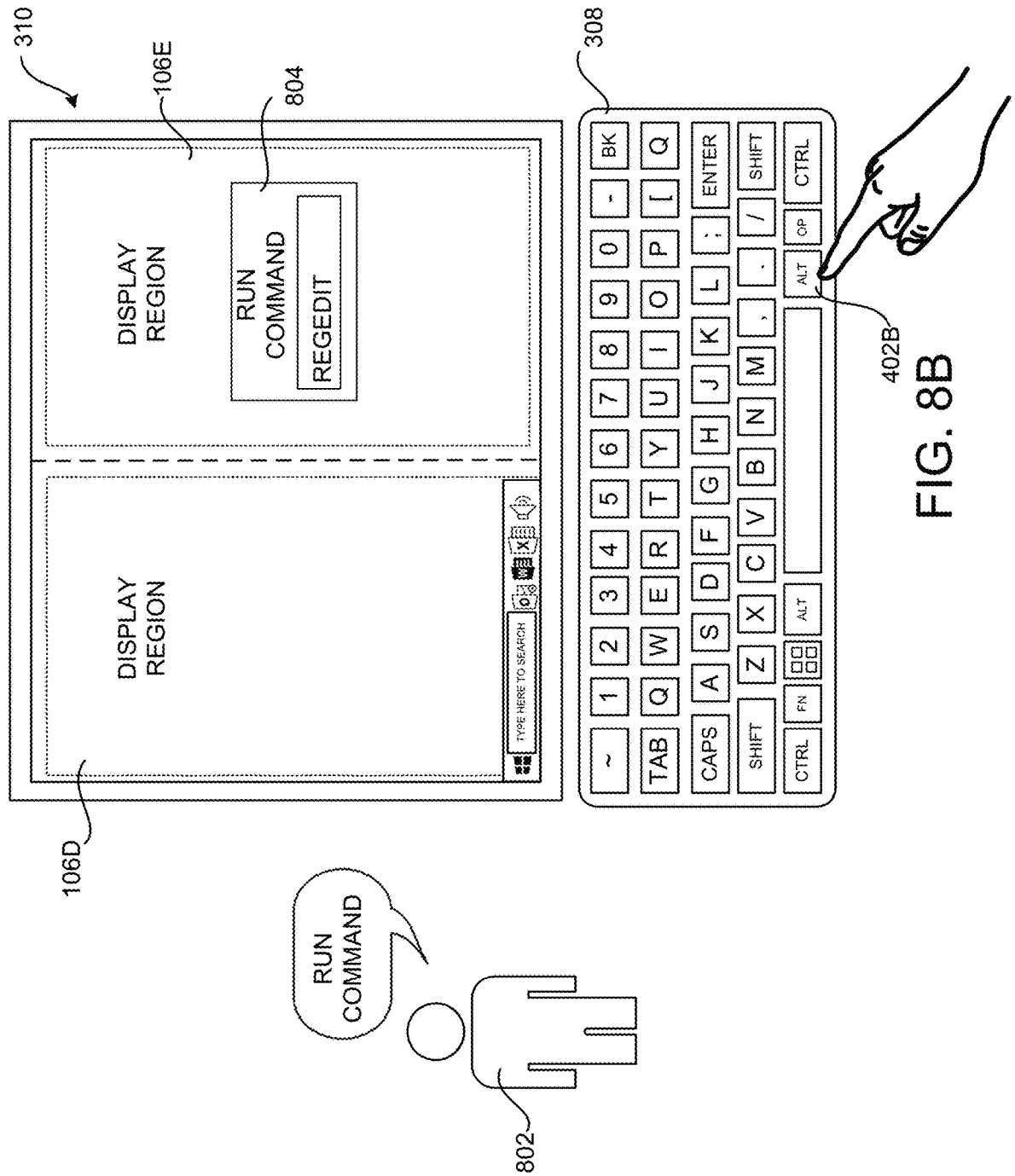

FIGS. 8A, 8B, and 9 are device user interface diagrams showing aspects of an illustrative global keyboard shortcut that targets a specific display region using multi-modal input, according to one embodiment. In these examples, keyboard input (e.g. one or more modifier keys) is combined with other non-keyboard inputs (referred to herein as "multi-modal input") to specify the display region 106 upon which an operation is to be performed.

For instance, in the example shown in FIG. 8A, a user 802 has pressed a modifier key 402A (the 'control' key in this example) to specify the display region 106D while simultaneously speaking a command (e.g. "run command"). The voice command spoken by the user 802 is then performed in the display region 106D specified by the keyboard combination. Consequently, a UI 804 for running a command is presented in the display region 106D.

Continuing the example from FIG. 8A, FIG. 8B shows an example where the user 802 has pressed a modifier key 402B (the 'alt key in this example) to specify the display region 106E while speaking the command. The voice command spoken by the user 802 is then performed in the display region 106E specified by the pressed modifier key 402B, which causes the user interface 804 associated with execution of the command to be presented in the display region 106E. In the examples shown in FIGS. 8A and 8B, the non-keyboard user input (i.e. the user's voice) specifies the command while the modifier keys 402A and 40B specify the display region 106 in which the command is to be initiated.

In the example shown in FIG. 9, a user has performed a multi-touch gesture 802 in the region 106D with two fingers. In this case, a two finger press specifies that operations are to be initiated on the display region 106E. Accordingly, when the user also presses the global shortcut key 304, the corresponding operation (presentation of the start menu in this example) is performed in the region 106E. This mechanism can operate even if the user performs a gesture on a display region 106E that is occluded from the user's view (e.g. a display region on the back of a folded device). In this example, the non-keyboard user input specifies the display region 106E in which the command is to be initiated while the global shortcut key 304 specifies the command (i.e. displaying the start menu).

It is to be appreciated that global keyboard shortcuts using multi-modal input can leverage other types of user and device input as modifiers for the global shortcut key 304. For example, and without limitation, device buttons, hinge angles (as determined by an appropriate sensor), held touch states on a screen region, device posture, and other types of inputs can be used.

Figure 10:
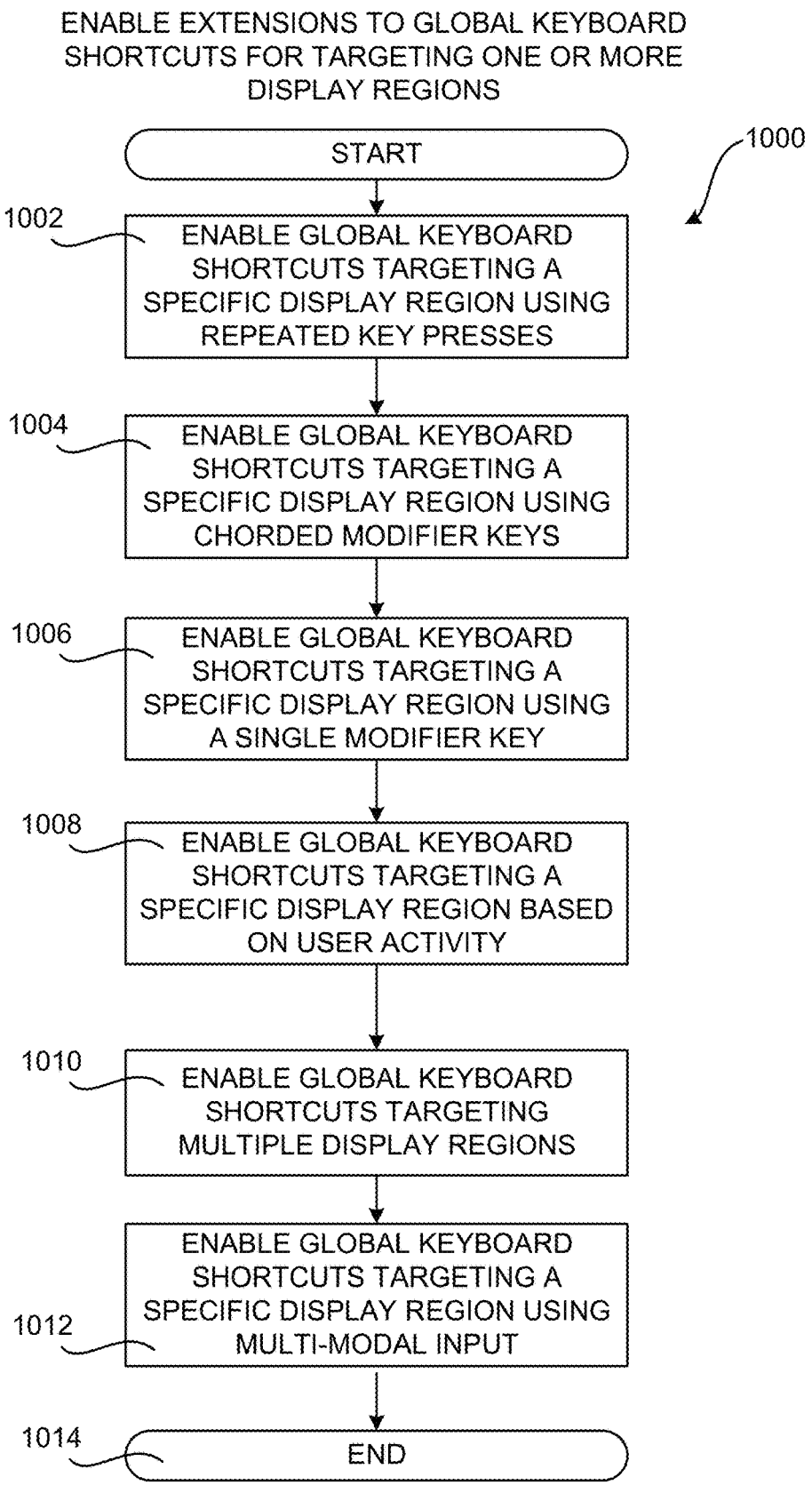
FIG. 10 is a flow diagram illustrating a routine for extending global keyboard shortcuts to target specified or multiple display regions, according to one embodiment disclosed herein.

FIG. 10 is a flow diagram showing a routine 1000 that illustrates aspects of the operation of a foldable computing device 310 for providing extensions to global keyboard shortcuts, according to one embodiment disclosed herein. It should be appreciated that the logical operations described herein with regard to FIG. 10, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 1000 begins at operation 1002, where a computing device supporting multiple display regions enables global keyboard shortcuts targeting a specific display region 106 using repeated key presses in the manner described above with reference to FIGS. 3A and 3B, for example. The routine 1000 then proceeds from operation 1002 to operation 1004, where the computing device additionally or alternately enables global keyboard shortcuts targeting a specific display region 106 using chorded modifier keys in the manner described above with regard to FIGS. 4A and 4B, for instance.

The routine 1000 then proceeds from operation 1004 to operation 1006 where the computing device additionally or alternately enables global keyboard shortcuts targeting a specific display region 106 using a single modifier key such as in the manner described above with regard to FIG. 5. From operation 1004, the routine 1000 proceeds to operation 1008, where the computing device additionally or alternately enables global keyboard shortcuts targeting a specific display region 106 based on user activity such as in the manner described above with regard to FIG. 6.

From operation 1008, the routine 1000 proceeds to operation 1010, where the computing device additionally or alternately enables global keyboard shortcuts supporting multiple display regions 106 such as in the manner described above with regard to FIG. 7. The routine 1000 then proceeds to operation 1012, where the computing device additionally or alternately enables global keyboard shortcuts targeting a specific display region 106 using multi-modal input such as in the manner described above with regard to FIGS. 8 and 9. From operation 1012, the routine 1000 proceeds to operation 1014, where it ends.

Figure 11:
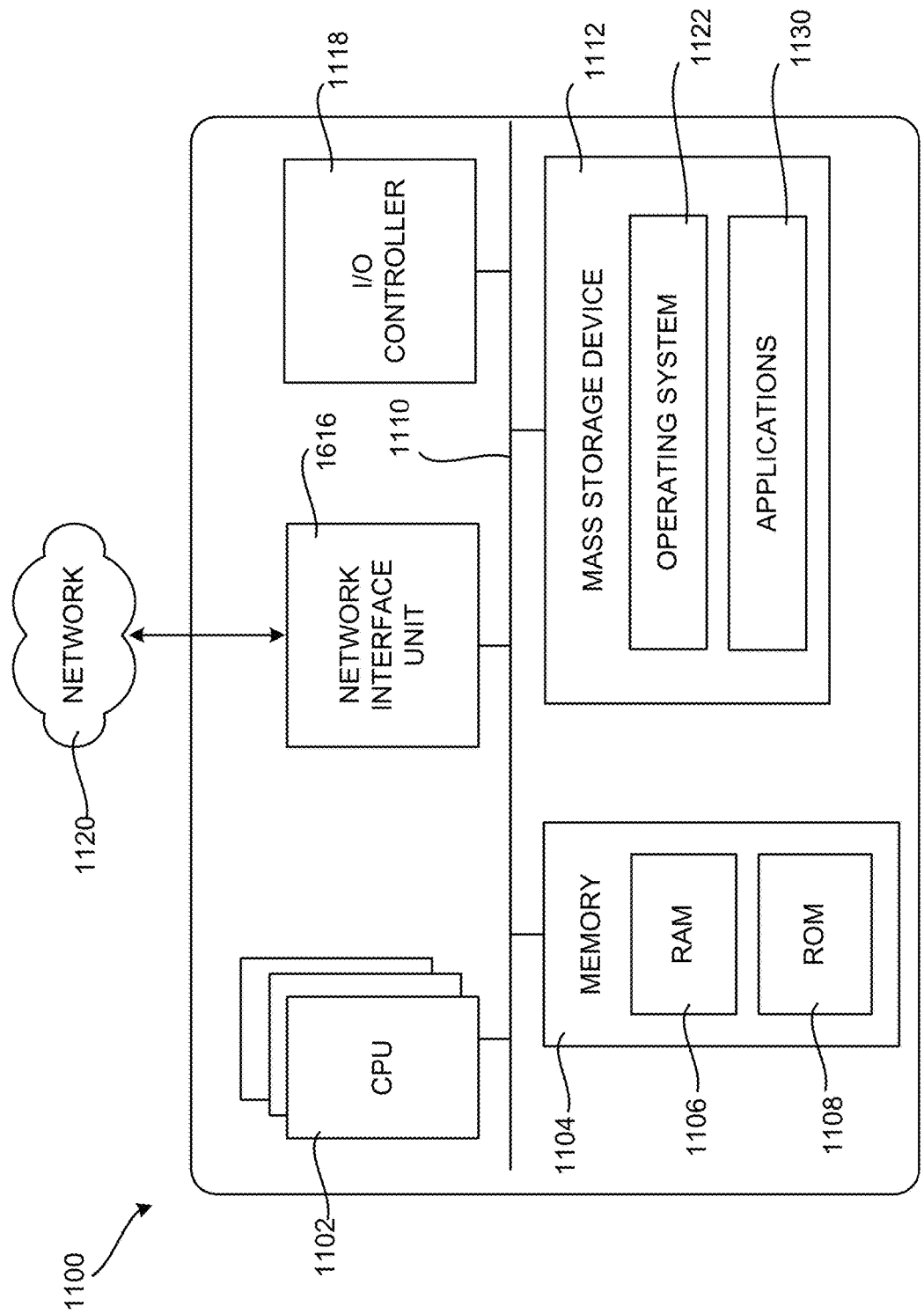
FIG. 11 is a computer architecture diagram showing an illustrative computer hardware and software architecture for a computing device that can implement aspects of the technologies presented herein.

FIG. 11 is a computer architecture diagram showing an illustrative computer hardware and software architecture for a computing device that can implement the various technologies presented herein. In particular, the architecture illustrated in FIG. 11 can be utilized to implement a multi-screen computing device, such as the hinged devices 102 and bendable devices 202 described herein. The illustrated architecture can also be utilized to implement other types of computing systems supporting multiple display regions that can be utilized to implement the disclosed technologies.

The computer 1100 illustrated in FIG. 11 includes a central processing unit 1102 ("CPU"), a system memory 1104, including a random-access memory 1106 ("RAM") and a read-only memory ("ROM") 1108, and a system bus 1110 that couples the memory 1104 to the CPU 1102. A basic input/output system ("BIOS" or "firmware") containing the basic routines that help to transfer information between elements within the computer 1100, such as during startup, can be stored in the ROM 1108.

The computer 1100 further includes a mass storage device 1112 for storing an operating system 1122, application programs 1130, and other types of programs. The functionality described above is implemented by one or more of these programs in various configurations. The mass storage device 1112 can also be configured to store other types of programs and data.

The mass storage device 1112 is connected to the CPU 1102 through a mass storage controller (not shown) connected to the bus 1110. The mass storage device 1112 and its associated computer readable media provide non-volatile storage for the computer 1100. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 1100.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 1100. For purposes of the claims, the phrase "computer storage medium," and variations thereof, does not include waves or signals per se or communication media.

According to various configurations, the computer 1100 can operate in a networked environment using logical connections to remote computers through a network such as the network 1120. The computer 1100 can connect to the network 1120 through a network interface unit 1116 connected to the bus 1110. It should be appreciated that the network interface unit 1116 can also be utilized to connect to other types of networks and remote computer systems. The computer 1100 can also include an input/output controller 1118 for receiving and processing input from a number of other devices, including a keyboard, mouse, touch input, a digital pen, or a physical sensor such as cameras and biometric sensors.

The computer 1100 can also be configured with a suitable video output device that can provide output to one or more display screens, such as those described above. One or more of the displays can be a touch-sensitive display that is configured to detect the presence and location of a touch. Such a display can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen is incorporated on top of a display as a transparent layer to enable a user to use one or more touches to interact with objects or other information presented on the display.

A touch-sensitive display can be configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims.

In some configurations, the computer 1100 supports a tap gesture in which a user taps a display once. A double tap gesture in which a user taps a display twice can also be supported. The double tap gesture can be used for various reasons including, but not limited to, zooming in or zooming out in stages. In some configurations, the computer 1100 supports a tap and hold gesture in which a user taps and maintains contact for at least a pre-defined time. The tap and hold gesture can be used for various reasons including, but not limited to, opening a context-specific menu.

In some configurations, the computer 1100 supports a pan gesture in which a user places a finger on a display and maintains contact with display while moving their finger. The pan gesture can be used for various reasons including, but not limited to, moving through screens, images, or menus at a controlled rate. Multiple finger pan gestures are also contemplated.

In some configurations, the computer 1100 supports a flick gesture in which a user swipes a finger in the direction the user wants the screen to move. The flick gesture can be used for various reasons including, but not limited to, scrolling horizontally or vertically through menus or pages. In some configurations, the computer 1100 supports a pinch and stretch gesture in which a user makes a pinching motion with two fingers (e.g., thumb and forefinger) or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as digital pens can be used to interact with the computing device 1100. As such, the above gestures should be understood as being illustrative and should not be construed as being limiting in any way.

It should be appreciated that the software components described herein, when loaded into the CPU 1102 and executed, can transform the CPU 1102 and the overall computer 1100 from a general-purpose computing device into a special-purpose computing device customized to facilitate the functionality presented herein. The CPU 1102 can be constructed from any number of transistors or other discrete circuit elements, which can individually or collectively assume any number of states. More specifically, the CPU 1102 can operate as a finite-state machine, in response to executable instructions contained within the software modules disclosed herein. These computer-executable instructions can transform the CPU 1102 by specifying how the CPU 1102 transitions between states, thereby transforming the transistors or other discrete hardware elements constituting the CPU 1102.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media.

These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 1100 in order to store and execute the software components presented herein. It also should be appreciated that the architecture shown in FIG. 11 for the computer 1100, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 1100 might not include all of the components shown in FIG. 11, can include other components that are not explicitly shown in FIG. 11, or can utilize an architecture completely different than that shown in FIG. 11.

It should be appreciated that the computing architecture shown in FIG. 11 has been simplified for ease of discussion. It should also be appreciated that the illustrated computing architecture can include and utilize many more computing components, devices, software programs, networking devices, and other components not specifically described herein.

The disclosure presented herein also encompasses the subject matter set forth in the following clauses:

Clause 1. A computer-implemented method performed by a computing device, the method comprising: detecting a press of a global shortcut key simultaneously with a first press and release of a modifier key; and responsive to detecting the press of the global shortcut key simultaneously with the first press and release of the modifier key, initiating an operation in a non-default display region provided by the computing device.

Clause 2. The computer-implemented method of clause 1, further comprising: detecting a second press and release of the modifier key simultaneously with the press of the global shortcut key; and responsive to detecting the second press and release of the modifier key simultaneously with the press of the global shortcut key, initiating the operation in a second display region provided by the computing device.

Clause 3. The computer-implemented method of any of clauses 1 or 2, wherein the second display region comprises a default display region.

Clause 4. The computer-implemented method of any of clauses 1-3, wherein the second press and release of the modifier key is detected within a predetermined period of time following the detection of the first press and release of modifier key.

Clause 5. The computer-implemented method of any of clauses 1-4, wherein initiating an operation in the non-default display region comprises displaying a user interface (UI) element in the non-default display region.

Clause 6. The computer-implemented method of any of clauses 1-5, wherein initiating the operation in the second display region comprises displaying a user interface (UI) element in a default display region provided by the computing device.

Clause 7. The computer-implemented method of any of clauses 1-6, further comprising simultaneously initiating the operation in one or more other display regions provided by the computing device responsive to detecting the press of the global shortcut key simultaneously with the press of the modifier key.

Clause 8. The computer-implemented method of any of clauses 1-7, wherein the operation comprises sharing a region that encompasses the non-default display region and the one or more other display regions provided by the computing device.

Clause 9. A non-transitory computer-readable storage medium having computer-executable instructions stored thereupon which, when executed by a processor of a computing device, cause the processor to: detect a press of a global shortcut key simultaneously with a first press and release of a modifier key; and responsive to detecting the press of the global shortcut key simultaneously with the first press and release of the modifier key, initiate an operation in a non-default display region provided by the computing device.

Clause 10. The non-transitory computer-readable storage medium of clause 9, having further computer-executable instructions stored thereupon to: detect a second press and release of the modifier key simultaneously with the press of the global shortcut key; and responsive to detecting the second press and release of the modifier key simultaneously with the press of the global shortcut key, initiate the operation in a second display region provided by the computing device.

Clause 11. The non-transitory computer-readable storage medium of any of clauses 9 or 10, wherein the second display region comprises a default display region.

Clause 12. The non-transitory computer-readable storage medium of any of clauses 9-11, wherein the second press and release of the modifier key is detected within a predetermined period of time following the detection of the first press and release of modifier key.

Clause 13. The non-transitory computer-readable storage medium of any of clauses 9-12, wherein initiating an operation in the non-default display region comprises displaying a UI element in the non-default display region and wherein initiating the operation in the second display region comprises displaying the UI element in a default display region provided by the computing device.

Clause 14. The non-transitory computer-readable storage medium of any of clauses 9-13, having further computer-executable instructions stored thereupon to simultaneously initiate the operation in one or more other display regions provided by the computing device responsive to detecting the press of the global shortcut key simultaneously with the press of the modifier key.

Clause 15. A computing device, comprising: a processor; and a non-transitory computer readable medium storing instructions executable by the processor to: detect a press of a global shortcut key simultaneously with a first press and release of a modifier key; and responsive to detecting the press of the global shortcut key simultaneously with the first press and release of the modifier key, initiate an operation in a non-default display region provided by the computing device.

Clause 16. The computing device of any clause 15, wherein the non-transitory computer readable medium stores further instructions executable by the processor to: detect a second press and release of the modifier key simultaneously with the press of the global shortcut key; and responsive to detecting the second press and release of the modifier key simultaneously with the press of the global shortcut key, initiate the operation in a second display region provided by the computing device.

Clause 17. The computing device of any of clauses 15 or 16, wherein the second display region comprises a default display region.

Clause 18. The computing device of any of clauses 15-17, wherein the second press and release of the modifier key is detected within a predetermined period of time following the detection of the first press and release of modifier key.

Clause 19. The computing device of any of clauses 15-18, wherein initiating an operation in the non-default display region comprises displaying a UI element in the non-default display region and wherein initiating the operation in the second display region comprises displaying the UI element in a default display region provided by the computing device.

Clause 20. The computing device of any of clauses 15-19, wherein the non-transitory computer readable medium stores further instructions executable by the processor to simultaneously initiate the operation in one or more other display regions provided by the computing device responsive to detecting the press of the global shortcut key simultaneously with the press of the modifier key.

Based on the foregoing, it should be appreciated that technologies for providing extensions to global keyboard shortcuts for computing devices having multiple display regions have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method performed by a computing device, the method comprising:
    detecting a press of a global shortcut key simultaneously with a first press of a modifier key; and
    responsive to detecting the press of the global shortcut key simultaneously with the first press of the modifier key:
        initiating an operation in a non-default display region provided by the computing device; and
        simultaneously initiating the operation in one or more other display regions provided by the computing device.

2. The computer-implemented method of claim 1, further comprising:
    detecting a second press of the modifier key simultaneously with the press of the global shortcut key; and
    responsive to detecting the second press of the modifier key simultaneously with the press of the global shortcut key, initiating the operation in a second display region provided by the computing device.

3. The computer-implemented method of claim 2, wherein the second display region comprises a default display region.

4. The computer-implemented method of claim 2, wherein the second press of the modifier key is detected within a predetermined period of time following the detection of the first press of the modifier key.

5. The computer-implemented method of claim 2, wherein initiating the operation in the second display region comprises displaying a user interface (UI) element in a default display region provided by the computing device.

6. The computer-implemented method of claim 1, wherein initiating an operation in the non-default display region comprises displaying a user interface (UI) element in the non-default display region.

7. The computer-implemented method of claim 1, wherein the operation comprises sharing a region that encompasses the non-default display region and the one or more other display regions provided by the computing device.

8. A non-transitory computer-readable storage medium having computer-executable instructions stored thereupon which, when executed by a processor of a computing device, cause the processor to:
    detect a press of a global shortcut key simultaneously with a first press of a modifier key; and
    responsive to detecting the press of the global shortcut key simultaneously with the first press of the modifier key:
        initiate an operation in a non-default display region provided by the computing device and
        simultaneously initiating the operation in one or more other display regions provided by the computing device.

9. The non-transitory computer-readable storage medium of claim 8, having further computer-executable instructions stored thereupon to:
    detect a second press of the modifier key simultaneously with the press of the global shortcut key; and
    responsive to detecting the second press of the modifier key simultaneously with the press of the global shortcut key, initiate the operation in a second display region provided by the computing device.

10. The non-transitory computer-readable storage medium of claim 9, wherein the second display region comprises a default display region.

11. The non-transitory computer-readable storage medium of claim 9, wherein the second press of the modifier key is detected within a predetermined period of time following the detection of the first press of the modifier key.

12. The non-transitory computer-readable storage medium of claim 9, wherein initiating an operation in the non-default display region comprises displaying a UI element in the non-default display region and wherein initiating the operation in the second display region comprises displaying the UI element in a default display region provided by the computing device.

13. The non-transitory computer-readable storage medium of claim 8, wherein the operation comprises sharing a region that encompasses the non-default display region and the one or more other display regions provided by the computing device.

14. A computing device, comprising:
    a processor; and
    a non-transitory computer readable medium storing instructions executable by the processor to:
        detect a press of a global shortcut key simultaneously with a first press of a modifier key; and
        responsive to detecting the press of the global shortcut key simultaneously with the first press of the modifier key:

initiate an operation in a non-default display region provided by the computing device; and simultaneously initiating the operation in one or more other display regions provided by the computing device.

15. The computing device of claim 14, wherein the non-transitory computer readable medium stores further instructions executable by the processor to:

detect a second press of the modifier key simultaneously with the press of the global shortcut key; and responsive to detecting the second press of the modifier key simultaneously with the press of the global shortcut key, initiate the operation in a second display region provided by the computing device.

16. The computing device of claim 15, wherein the second display region comprises a default display region.

17. The computing device of claim 15, wherein the second press of the modifier key is detected within a predetermined period of time following the detection of the first press of the modifier key.

18. The computing device of claim 15, wherein initiating an operation in the non-default display region comprises displaying a UI element in the non-default display region and wherein initiating the operation in the second display region comprises displaying the UI element in a default display region provided by the computing device.

19. The computing device of claim 14, wherein the operation comprises sharing a region that encompasses the non-default display region and the one or more other display regions provided by the computing device.

\* \* \* \* \*